Figure 1:
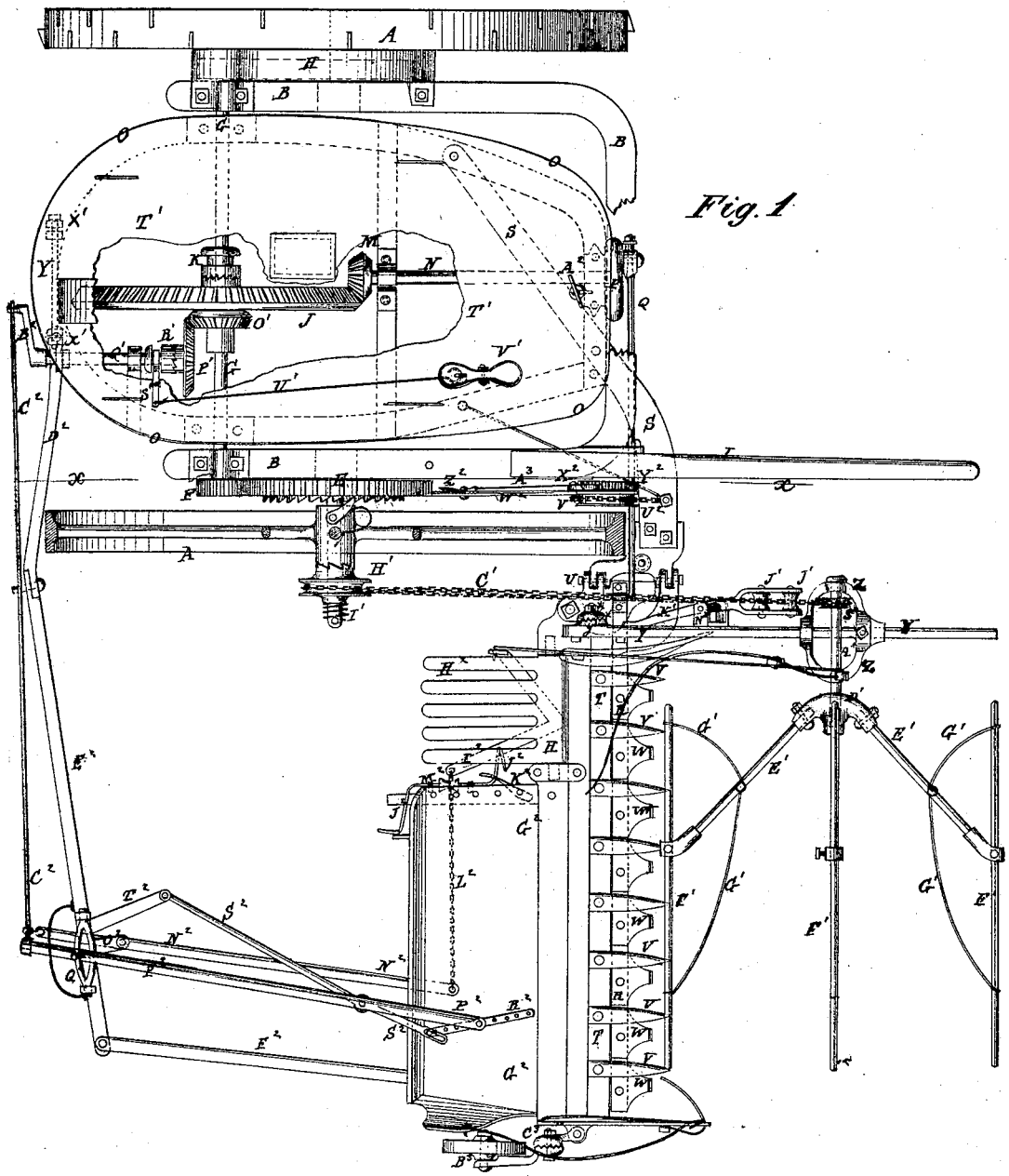

N. T. VEATCH.
Improvement in Harvesters.

No. 129,501.  2 Sheets--Sheet 1.

Patented July 16, 1872.

Witnesses:
A. W. Almqvist
Francis McArdle

Inventor:
Nathan T. Veatch
PER
Attorneys.

N. T. VEATCH.  
Improvement in Harvesters.  
No. 129,501.  2 Sheets--Sheet 2.  
Patented July 16, 1872.
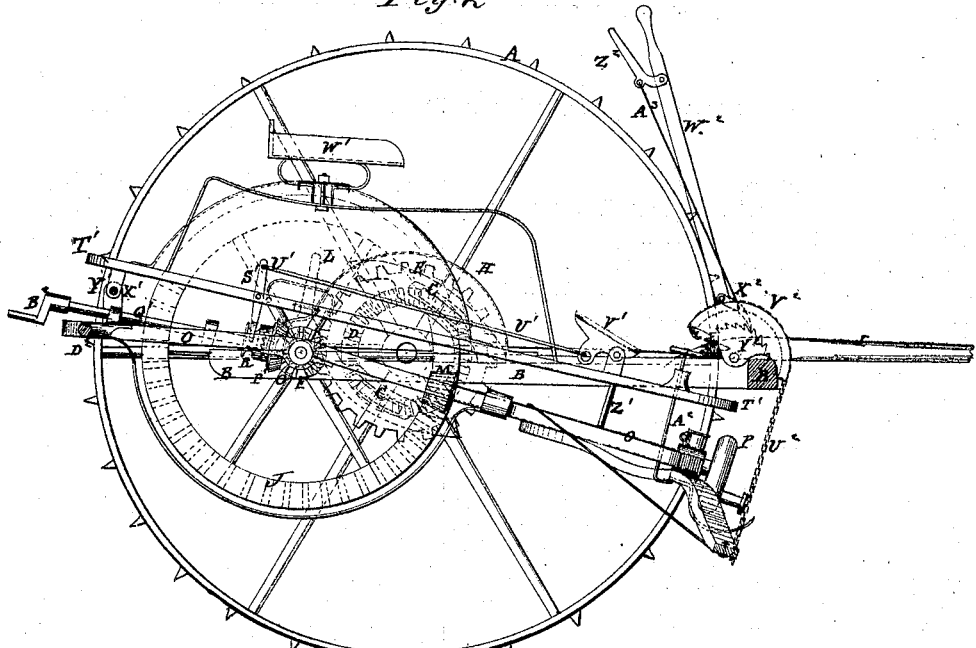
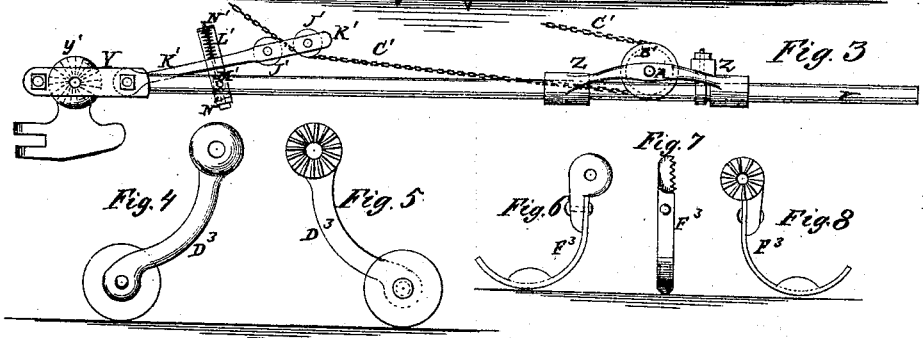
Witnesses:  
A. W. Almqvist  
Francis McArdle
Inventor:  
Nathan T. Veatch  
PER  
Attorneys.

129,501

UNITED STATES PATENT OFFICE.

NATHAN T. VEATCH, OF CAMDEN, ILLINOIS.

IMPROVEMENT IN HARVESTERS.

Specification forming part of Letters Patent No. 129,501, dated July 16, 1872.

*To all whom it may concern:*

Be it known that I, NATHAN T. VEATCH, of Camden, in the county of Schuyler and State of Illinois, have invented a new and useful Improvement in Reapers; and I do hereby declare that the following is a full, clear, and exact description thereof, which will enable others skilled in the art to make and use the same, reference being had to the accompanying drawing, forming part of this specification.

Figure 1, Sheet 1, is a top view of my improved machine, parts being broken away to show the construction. Fig. 2, Sheet 2, is a detail sectional view of the same taken through the line $x\, x$, Fig. 1. Fig. 3, Sheet 2, is a detail view of the reel-post. Figs. 4 and 5, Sheet 2, are detail views of the wheel and standard that support the inner end of the cutter-bar when adjusted as a mower. Figs. 6, 7, and 8, Sheet 2, are detail views of the shoe that supports the outer end of the cutter-bar when adjusted as a mower. Fig. 9, Sheet 2, is a detail view of the track-clearer.

My invention relates to improvements in reapers; and it consists in the construction and combination of various parts of the machine, as hereinafter more fully described and claimed.

A are two drive-wheels, which revolve upon short axles attached to the frame B. To the inner side of each of the drive-wheels A are attached two spring-pawls, C, which take hold of the teeth of the ratchet-wheels D formed upon the outer sides of the gear-wheels E, which revolve upon the inner parts of the axles of the wheels A, and the teeth of which mesh into the teeth of the small gear-wheels F attached to the ends of the shaft G, which revolves in bearings attached to the frame B. The gear-wheels E are covered and protected by caps H attached to the frame B, to which frame is also attached the tongue I. Upon the middle part of the shaft G is placed a large bevel-gear wheel, J, and a sliding-clutch, K, operated by a lever, L, so that the said shaft may be made to carry the said gear-wheel with it when desired. The teeth of the large bevel-gear wheel J mesh into the teeth of a small bevel-gear wheel, M, attached to the rear end of the shaft N, which revolves in bearings in the forward part of the frame O, which is pivoted to and supported by the said shaft G. To the forward end of the shaft N is attached a small crank-wheel, P, to the crank-pin of which is pivoted the inner end of the pitman Q, the outer end of which is connected with the sickle-bar R. To the forward part of the frame O is securely attached a bar, S, to the outer end of which is hinged the inner end of the finger-bar T, upon which the cutter-bar R works. The finger-bar T is connected with the supporting-bar S by a double-hinged arm, U, as shown in Fig. 1, so that when the finger-bar is raised by removing the pivot of the forward part of said hinge the said finger-bar may be turned back. V are the guard-fingers, which are slotted to receive the sickles W, and both the upper and lower parts of which are secured to the said bar T. The sickles or cutter-sections W are made with a knife-edge, and with a long square point, and are designed to be fastened between two thin bars. The eye to which the pitman or driver Q is pivoted is made of brass, and is fastened between the upper thin bar and the inner sickle. To the double-hinged arm U is attached an arm, X, having a circular notched face, $x'$, upon the outer side of its upper end, into which fits a similar circular notched face, $y'$, formed upon or attached to the inner side of the lower end of the reel-post Y. The reel-post Y is secured to the arm X by a bolt passing through the centers of the notched faces $x'\, y'$, so that by loosening the said bolt the reel may be set forward or back as may be desired. Upon the upper part of the reel-post Y is placed a frame, Z, which is secured to said post by a bolt, so that the reel may be conveniently raised or lowered, as desired, or turned back when the finger-bar is turned back. $A^1$ is a shaft passing through and revolving in the middle part of the frame Z, and to which is attached a pulley, $B^1$, to receive the chain $C^1$ by which the reel is driven. To the outer end of the shaft $A^1$ is attached a block, $D^1$, to which are securely attached the inner ends of four inclined arms, $E^1$, to the outer ends of which are attached the middle parts of the reel-bars $F^1$. The reel-bars $F^1$ are made round and pass through casings upon the ends of the arms $E'$, where they are secured in place by a screw or bolt. The reel-bars $F^1$ are braced by wires $G^1$ attached to the arms $E^1$, and which have eyes formed upon their ends to slip over the ends of the reel-bars $F^1$. The chain $C^1$ passes around a pulley, H, placed upon the outer end of the axle of the wheel A. The pulley $H^1$ has teeth formed upon its inner side, which take hold of similar teeth formed upon the outer end of the hub of the wheel A, against which the said pulley $H^1$ is held by a coiled spring, I, placed upon the end of the said axle, so that the reel may be revolved by the wheel A in its forward movement, but not in its backward movement. The chain $C^1$ passes between two pulleys, $J^1$, pivoted in the slotted upper end of an arm, $K^1$, the lower end of which is pivoted to the lower part of the reel-post Y, and which is supported to give the desired tension to the chain $C^1$ by resting against the coiled spring $L^1$ placed upon a guide-rod, $M^1$, which passes through the arm $K^1$ and is attached to a bracket, $N^1$, which is pivoted to the reel-post Y. To the shaft G is attached a small bevel-gear wheel, $O^1$, into the teeth of which mesh the teeth of a bevel-gear wheel, $P^1$, running loosely upon the shaft $Q^1$, and which is made to carry the said shaft with it when desired, by a sliding clutch, $R^1$, placed upon the shaft and operated by a lever, $S^1$, which passes up through a slot in the platform $T^1$, and to its upper end is attached the rear end of the connecting-rod $U^1$. The forward end of the connecting-rod $U^1$ is pivoted to the foot-lever $V^1$ pivoted to the forward part of the platform $T^1$ in such a position that it may be conveniently operated by the driver with his foot while sitting upon his seat $W^1$, which is supported from the said platform $T^1$. The rear end of the platform $T^1$ is supported from the rear end of the frame O with which it is connected by the studs $X^1$, through which a long bolt, $Y^1$, passes. The forward end of the platform $T^1$ is supported by studs $Z^1$ which are attached to said platform, and the lower ends of which rest upon the said frame O. The forward part of the platform T' is also connected with the forward part of the frame O by the rod $A^2$, which has a hook formed upon its lower end to hook upon the said frame, and a handle formed upon or attached to its upper end to enable it to be conveniently operated by the driver. The shaft $Q^1$ works in bearings attached to the frame O, and to its outer or rear end is attached a crank, $B^2$, to the arm of which is pivoted the inner end of the rod $C^2$ which passes through a guide attached to the outer end of the arm $D^2$. The outer end of the arm $C^2$ is connected with the end of the rake-handle. The arm $D^2$ is rigidly attached to the frame O, and to its outer end is pivoted the end of a bar, $E^2$, the other end of which is bolted to the end of the arm $F^2$, the forward end of which is secured to the outer end of the stationary outer post $G^2$ of the platform, which is hinged to said finger-bar, so that it may be turned up or back when the finger-bar is raised. $H^2$ is the dropper or inner part of the platform, which is hinged to the finger-bar T, and is supported by the arm $I^2$ rigidly attached to the dropper $H^2$, and which, when the said dropper is raised, catches upon a shoulder or catch formed upon the downwardly-projecting end of the lever or bar $J^2$, which works in bearings attached to the stationary part $G^2$ of the platform, and the lower part of which is held forward in position to receive the dropper $H^2$ when raised by the spring $K^2$, also attached to the said stationary part $G^2$ of the platform. The other end of the lever or rod $J^2$ projects upward so as to be struck by the rake-handle as the grain is swept upon the dropper to release the dropper and allow it to drop the grain. To the rigid arm $I^2$ is attached the end of a short chain, $L^2$, which passes over a pulley, $M^2$, pivoted to the stationary part $G^2$ of the platform, and its other end is attached to the end of the lever $N^2$. The lever $N^2$ is pivoted to an arm, $O^2$, rigidly attached to the bar $E^2$ just beneath the point at which the rake-handle $P^2$ is pivoted to said bar $E^2$, so that the end of the lever $N^2$ may be struck by the end of the rake-handle $P^2$ as the rake rises and begins to move outward for another stroke to raise the dropper $H^2$ to again receive the grain. The rake-handle $P^2$, with the outer end of which the end of the rod $C^2$ is connected, is connected with the bar $F^2$ by a double-jointed hinge or connection, $Q^2$, so that it may have both a lateral and vertical movement. To the forward end of the handle $P^2$ is pivoted the rake-head $R^2$, which is held at right angles with the platform as it sweeps across it by the lever $S^2$, the inner end of which is pivoted to the rake-head $R^2$. The lever $S^2$ is pivoted to the rake-handle $P^2$, and its rear end is pivoted to an arm, $T^2$, attached to the double-jointed hinge $Q^2$. When adjusted for use as a reaper the inner end of the finger-bar is supported by a chain, $U^2$, the lower end of which is attached to the outer part of the bar S. The upper end of the chain $U^2$ is attached to a cam or segmental pulley, $V^2$, attached to the side of a lever, $W^2$, the lower end of which is pivoted to the forward part of the frame B, and the upper end of which extends up into such a position that it can be conveniently reached and operated by the driver. The lever $W^2$ is held in any position into which it may be moved by the pawl $X^2$ attached to its side, and which takes hold of the teeth of a stationary ratchet, $Y^2$, attached to the frame B. The pawl $X^2$ is raised to allow the cutter-bar to be lowered by the short hand-lever $Z^2$, pivoted to the upper part of the lever $W^2$, and which is connected to the said pawl by a rod, $A^3$.

When the machine is adjusted for use as a reaper, the outer end of the finger-bar is supported by a grain-wheel, $B^3$, upon the upper end of the standard of which is formed a circular toothed or notched face which fits upon a similar-faced arm, $C^3$, pivoted to the outer end of the said finger-bar.

When the machine is to be adjusted for use as a mower, the platforms, reel, grain-dividers, and grain-wheel are taken off. The traveler $D^3$ is fastened to the toothed face $X^1$ of the arm X; the track-cleaner $E^3$ is fastened to the outer end of the finger-bar; and the shoe F³ is fastened to the pivoted arm C³.

The machine, when adjusted as a mower, is adjusted for traveling by simply raising the finger-bar.

The machine when adjusted as a reaper is adjusted for traveling by taking off the connecting-rod C², unfastening the rake-supporting bar E² from the platform-bar F², and detaching the chain L² from the lever N². This allows the rake to be raised and dropped behind the driver's seat. The platforms G² H² are then raised, the front bolt of the hinge that connects the finger-bar to the bar S is taken out, and the cut-off rod is loosened. This allows the finger-bar to be turned back.

Having thus described my invention, I claim as new and desire to secure by Letters Patent—

1. The combination of the crank B² connecting-rod C², rake-handle P², double-jointed hinge or connection Q², rake-head R², lever S², and arm T² with each other and with the platform G², supporting-bar E², and shaft Q¹ driven from the driving-shaft G, substantially as herein shown and described, and for the purpose set forth.

2. The reel D¹ E¹ F¹ G¹, constructed substantially as herein shown and described, and for the purpose set forth.

3. The combination of the arm X with its notched face x¹, reel-post Y with its notched face y¹, frame Z, shaft A¹, pulley B¹, chain C¹, clutch-pulley H¹, coiled spring I¹, pulleys J¹, pivoted arm K¹, coiled spring L¹, bolt or rod M¹ and bracket N with each other and with the bar S, to which the finger-bar is hinged, and with the hub of the wheel A for supporting and driving the reel, substantially as herein shown and described.

4. The combination of the spring-catch or lever J² K², arm I², chain L², lever N², and arm O² with the dropper H², platform G², double-jointed hinge or connection Q², and rake-handle P², substantially as herein shown and described, for the purpose of raising and lowering the dropper by the movements of the rake, as set forth.

NATHAN T. VEATCH.

Witnesses:
WILLIAM E. ELLIOTT,
WILLSON ELLIOTT.